(12) United States Patent
Hewitt

(10) Patent No.: US 6,202,116 B1
(45) Date of Patent: Mar. 13, 2001

(54) WRITE ONLY BUS WITH WHOLE AND HALF BUS MODE OPERATION

(75) Inventor: Larry D. Hewitt, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/098,876

(22) Filed: Jun. 17, 1998

(51) Int. Cl.[7] .................................................. G06F 13/00
(52) U.S. Cl. ................................................ 710/129; 710/27
(58) Field of Search .................................. 710/107, 126, 710/127, 128, 14, 33, 66, 129

(56) References Cited

U.S. PATENT DOCUMENTS

| 5,125,080 | * | 6/1992 | Pleva et al. ............................. 710/129 |
| 5,422,883 | | 6/1995 | Hauris et al. ............................. 370/62 |
| 5,450,411 | | 9/1995 | Heil ...................................... 370/94.2 |
| 5,548,766 | * | 8/1996 | Kaneko et al. ........................ 710/127 |
| 5,613,078 | * | 3/1997 | Kishigami ............................. 710/126 |
| 5,621,898 | | 4/1997 | Wooten ................................. 395/297 |
| 5,640,392 | | 6/1997 | Hayashi ................................ 370/395 |
| 5,742,847 | | 4/1998 | Knoll et al. ........................... 395/866 |
| 5,758,105 | | 5/1998 | Kelley et al. .......................... 395/293 |
| 5,761,430 | | 6/1998 | Gross et al. ....................... 395/200.55 |
| 5,761,448 | | 6/1998 | Adamson et al. .................... 395/284 |
| 5,872,944 | * | 2/1999 | Goldrian et al. ..................... 710/126 |
| 5,872,998 | | 2/1999 | Chee .................................... 395/876 |
| 5,930,484 | * | 7/1999 | Tran et al. ............................ 710/107 |
| 5,948,080 | | 9/1999 | Baker ..................................... 710/37 |
| 6,014,720 | * | 1/2000 | Wang et al. .......................... 710/127 |

OTHER PUBLICATIONS

Intel Corporation, "Accelerated Graphics Port Interface Specification", Revision 1.0, Jul. 31, 1996, pp. 1–152.
Wickelgren, Ingred J., "The Facts About Fire Wire", IEEE Spectrum, Apr. 1997, pp. 20–25.
Glaskowsky, Peter N., "Cyrix Creates Ultimate CPU for Games", Microdesign Resources, Dec. 8, 1997, pp. 16–18.
Gwennap, Linley, "MediaGX Targets Low–Cost PCs", Microprocessor Report, vol. 11, No. 3, Mar. 10, 1997, pp. 1–6.
Compaq, Digital Equipment Corp., IBM PC Company, Intel, Microsoft, NEC, and Northern Telcom, "Universal Serial Bus Specification", Revision 1.0, Jan. 15, 1996, pp. 3–268, particularly Chapters 4 and 5.

* cited by examiner

Primary Examiner—Paul R. Myers
(74) Attorney, Agent, or Firm—Zagorin, O'Brien & Graham, LLP

(57) ABSTRACT

A data bus is divided into two portions. One portion of the bus transfers data from one side of the bus to the other and the other portion of the bus transfers data in the opposite direction. Bus cycles that originate from one side of the bus only go in one direction (from the originator to the other side). In order to avoid inefficiency because one of the portions of the bus may become unused if a long bus cycle is going in one direction while nothing is being transferred in the opposite direction, one side can take over the whole data bus and transfer data over both sides of the bus.

35 Claims, 2 Drawing Sheets

WRITE ONLY BUS WITH WHOLE AND HALF BUS MODE OPERATION

CROSS REFERENCE TO RELATED APPLICATIONS

This application relates to application Ser. No. 09/099,227, (now U.S. Pat. No. 6,032,211) filed the same day as the present application, entitled METHOD OF MODE CONTROL IN A BUS OPTIMIZED FOR PERSONAL COMPUTER TRAFFIC, by Larry Hewitt; and co pending application Ser. No. 09/098,854 filed the same day as the present application, entitled BUS OPTIMIZED FOR PERSONAL COMPUTER DATA TRAFFIC, by Larry Hewitt, both of which are incorporated herein by reference.

BACKGROUND OF THE INVENTION

1. Field of the Invention

This invention relates to communication of data in an electronic system and more particularly to a bus providing general communication capabilities.

2. Description of the Related Art

In electronic systems, busses transfer data between two parts of the system and typically between two or more integrated circuits. For example, in a computer system, one or more busses provide the path to transfer data (which may include control information) between a processor and an external device such as a printer, video monitor, keyboard, hard or floppy disk, etc. In the past, busses, such as those used on printed circuit boards to transfer data between integrated circuits, have operated at frequencies in which the transfer time needed to pass data between circuits coupled to the bus was comparatively insignificant. Many such busses are bi-directional allowing a circuit on the bus to perform both read and write operations on the bus. During a write operation, the circuit writing data sends data to another circuit on the bus. During a read operation, the reading device indicates that a read operation is taking place and specifies the address of the data it wants to read. The reading device provides this information but then allows the other circuit on the bus to provide the read data. That generally requires that the bus be "turned around" so that the bus can be driven from the circuit providing the data rather than from the circuit receiving the data. That requires that the circuit that is receiving read data on the bus turn off its drivers to ensure the bus is at a high impedance state. That allows the circuit providing the read data to drive the bus at suitable voltage levels.

However, advances in semiconductor technology have resulted in much higher frequencies of bus operation. As a result, the time required to turn around the direction of a bus is a much higher percentage of the total bus bandwidth than in the past. As the frequency of bus operations gets higher in the future, that percentage will continue to grow.

For example, a bus may be operating at 1 gigahertz (GHz.), or one nanosecond per transfer of data. To achieve this operating speed, present high speed bus approaches utilize a point-to-point bus, which connects no more than two integrated circuits. A clock must typically be sent from each side to the other side (clock forwarding) to make sure that the data is synchronized to a clock as it is received. However, it may take up to 5 nanoseconds for data to be transmitted from one side of the bus to the other, depending of course on a number of factors including, e.g., the length of the bus. If, as is typical of busses, there is an arbiter for the bus in one location, a bus request by one integrated circuit to the arbiter in another integrated circuit would typically require about 5 nanoseconds for transmission, another 5 nanoseconds to change clock domains, another 5 nanoseconds to transmit the grant, and still another 5 nanoseconds to change clock domains again. So, in total, up to 20 nanoseconds have been consumed in order to acquire the bus for a bus cycle that may need to be only 5 or 10 nanoseconds long.

Thus, it would be desirable to provide a high speed bus in which the impact of turning the bus around is minimized and the utilization of the bus is maximized.

SUMMARY OF THE INVENTION

Accordingly, the present invention splits the data bus in half and dedicates half of the bus to transfer data from one side of the bus to the other and the other half of the bus to transfer data in the opposite direction. Bus cycles that originate from one side of the link only go one direction (from the originator to the other side). In order to avoid inefficiency because half of the bus may become unused if a long bus cycle is going in one direction while nothing is being transferred in the opposite direction, one side can take over the whole data bus during a transmission over its half of the data bus and transfer data over both sides of the bus.

Accordingly, in one embodiment of the invention a method of communicating on a bus is provided. The bus, which couples a first and second bus interface circuit, includes a plurality of data lines divided into a first group and a second group. The method includes transferring first data over the first group data lines from the first to the second bus interface circuit during a first time period on the bus. Second data is transferred over the bus from the second to the first bus interface circuit over the second group of data lines during the first time period. Third data is transferred over the bus from the first to the second bus interface circuit over the first and second group of data lines during a second time period, the second time period being different from the first time period.

In another embodiment of the invention a bus interface circuit for interfacing to a bus, includes a first transmit controller coupled to transmit first data in half bus mode to a first group of data lines of the bus during a first time period. The bus interface circuit further includes a first receive controller that receives second data in half bus mode from a second group of data lines of the bus during the first time period. The bus interface circuit, responsive to a granted request, transmits third data in whole bus mode to the first and second group of data lines during a second time period, the second time period being different from the first time period.

BRIEF DESCRIPTION OF THE DRAWINGS

The present invention may be better understood, and its numerous objects, features, and advantages made apparent to those skilled in the art by referencing the accompanying drawings.

DESCRIPTION OF THE PREFERRED EMBODIMENT(S)

Figure 1:
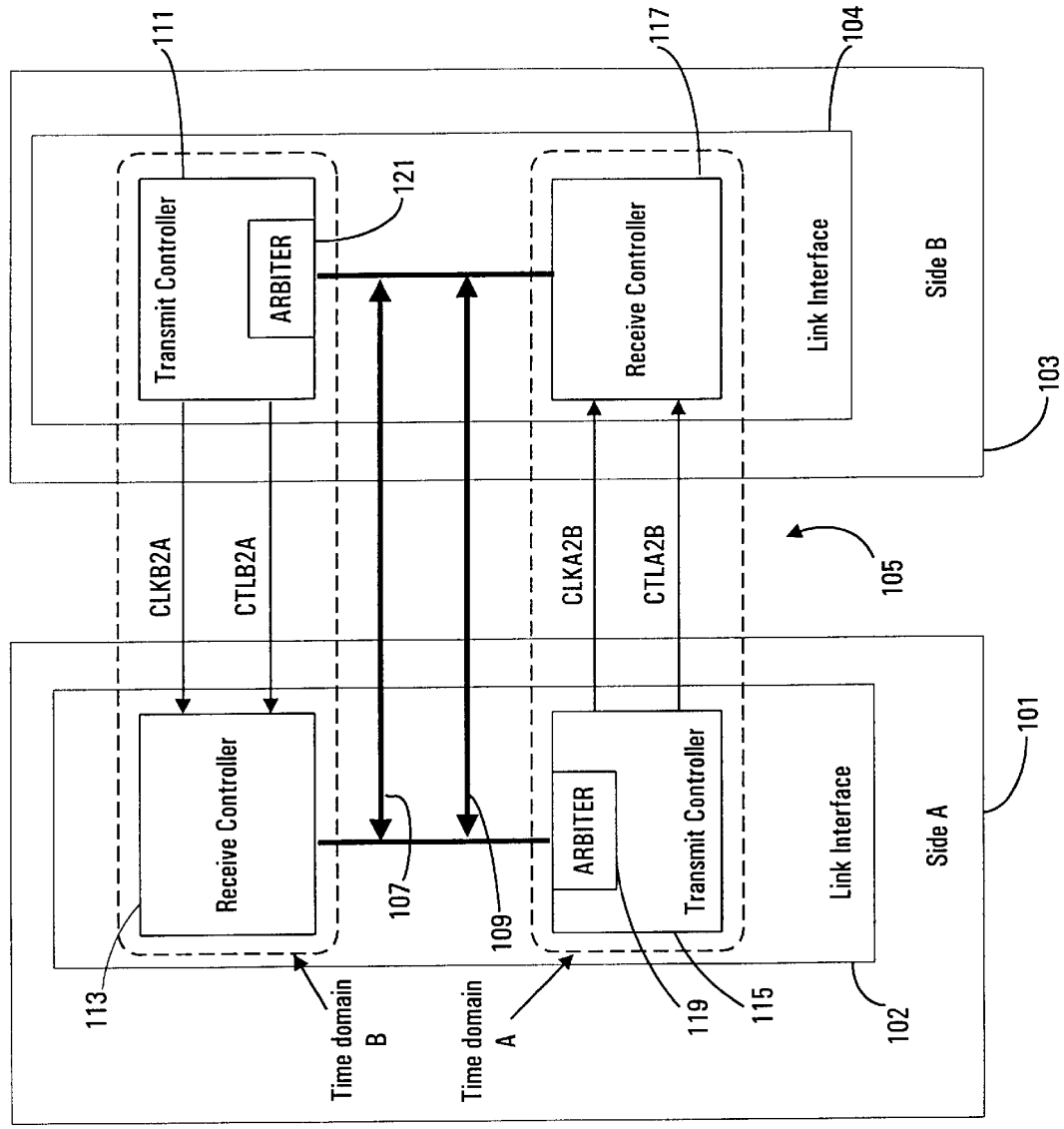
FIG. 1 shows two integrated circuits coupled by a bus according to the present invention.

Referring to FIG. 1, an electronics system implementing one embodiment of the present invention is shown. Integrated circuit 101 includes a link interface 102 which is coupled to link interface 104 in integrated circuit 103 via bus (also referred to herein as link) 105. Integrated circuit 101 is arbitrarily designated side A and integrated circuit 103 is designated as side B. Bus 105 includes two bi-directional data portions 107 and 109. In one embodiment, each data portion contains one byte (8 bits) of data ($2^3$–1:0). However, the number of bits on the data bus (DB) is may be of size ($2^n$–1:0) where n is an integer >0. Bus 105 also includes a unidirectional clock line CLKB2A and a unidirectional control line CTLB2A provided by link interface 104 to integrated circuit 101. Bus 105 includes a second unidirectional clock line CLKA2B and a second unidirectional control line CTLA2B, which are provided by integrated circuit 101 to integrated circuit 103. The use of the control lines to send bus (control messages) is further described in co pending application Ser. No. 09/098,854 filed the same day as the present application, entitled "BUS OPTIMIZED FOR PERSONAL COMPUTER DATA TRAFFIC." At least one of the integrated circuits illustrated in FIG. 1 may be a processor utilized in a personal computer system.

Data portion 107 transmits data, in a de fault mode of operation, from transmit controller 111 to receive controller 113 (from side B to side A). The data is transmitted synchronously with CLKB2A. Data portion 109 of the data bus is dedicated, in a default mode of operation to transmit data from transmit controller 115 to receive controller 117 (side A to side B), synchronously with CLKA2B. Thus, the side A transmit controller and side B receive controller are included in the same time domain, called time domain A, and the side B transmit controller and the side A receive controller are included in the same time domain, called time domain B.

A bus cycle on bus 105 is defined as a block transfer of either addressing information or addressing information and data. The addressing information determines where in the integrated circuit a particular access is targeted. A bus cycle may be a long or short bus cycle. In an exemplary embodiment, a long bus cycle may utilize several hundred nanoseconds of bus time while a short bus cycle uses less than, e.g., 20 nanoseconds.

All bus cycles are writes. Reads are accomplished by (1) sending a read request from a first side to the second side, after which, (2) the read data is retrieved and, in a separate cycle, sent from the second side to the requesting side.

Bus cycles that originate from one side of the link only go one direction (from the originator to the other side). However, that can lead to inefficiency because half of the bus becomes unused if a long bus cycle is going in one direction while nothing is being transferred in the opposite direction. Therefore, one side of the bus is allowed take over the whole data bus at any point during a transmission over its half of the data bus, by arbitrating for the other half as explained further herein.

In the embodiment shown, the data bus is split in half, with the least significant bits (LSBs) controlled by the side A time domain and the most significant bits (MSBs) controlled by the side B time domain. The local half-bus refers to the half of the bus that is defaulted to be owned by the local transmit controller on an integrated circuit. Thus, the local half-bus for transmit controller 115 is half-bus 109. The external half-bus refers to the other half of the bus, the half that is defaulted to be owned by the transmit controller on the other side of the link (MSBs for side A and LSBs for side B). That is, the external half-bus for transmit controller 115 is portion 107 of the data bus which defaults to be owned by transmit control 111.

Each transmit controller 115 and 111, include an arbiter 119 and 121, respectively, for the local half-bus to determine if it will be used to transmit data (default mode) or if it will be used to receive data. Half-bus mode refers to the default state of the link, in which side A controls the LSBs and side B controls the MSBs. Whole-bus mode refers to the state in which an external half-bus has been granted to a transmit controller and data is transferred over all the bits of the data bus in one direction simultaneously.

Figure 2:
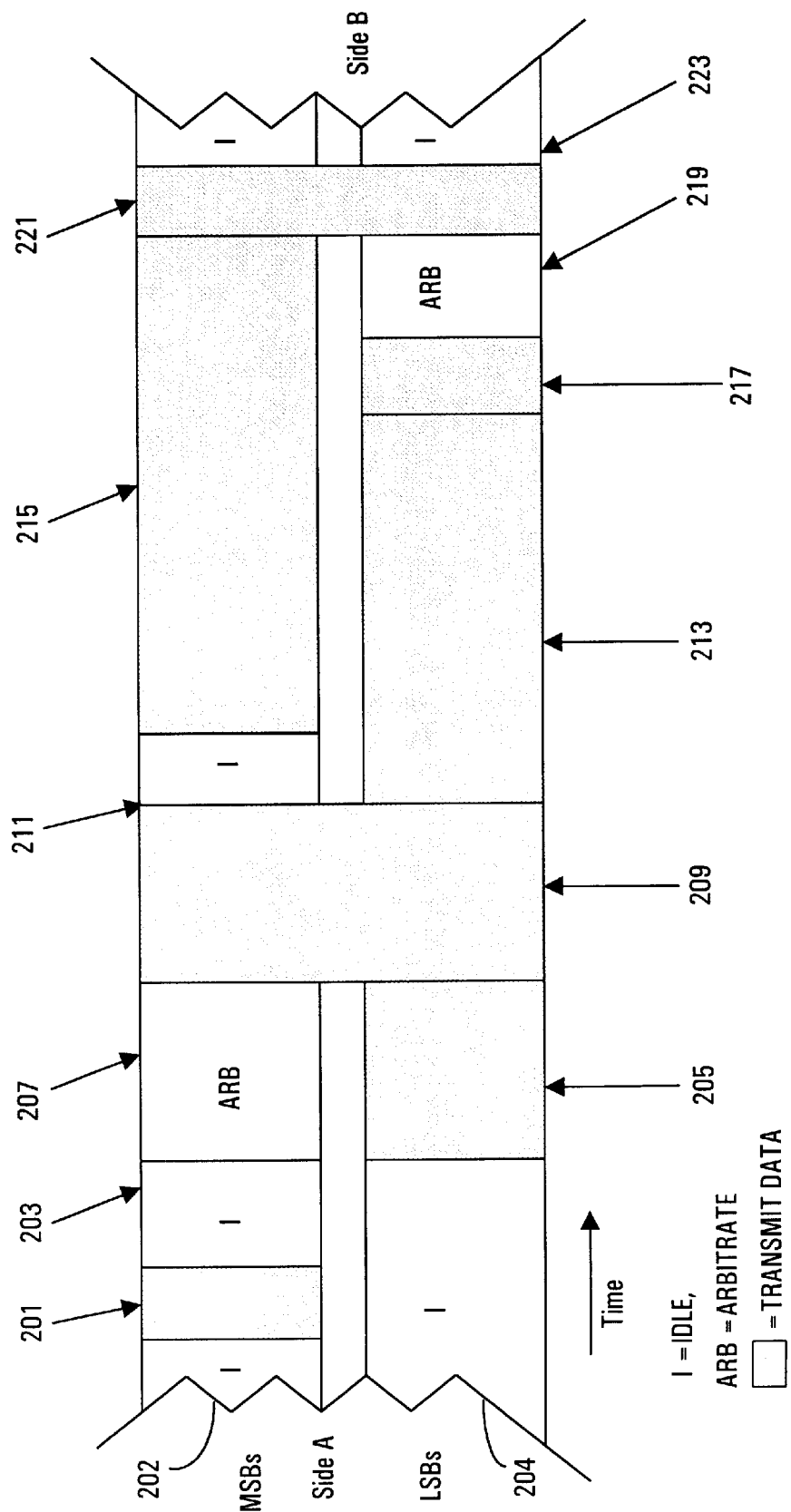
FIG. 2 shows a timing diagram of whole-bus and half-bus transfers across the bus.

Referring to FIG. 2, a timing diagram is shown illustrating the use of bus 105 in both whole-bus and half-bus modes. The side B half-bus, transferring data from side B to side A is shown at 202. The side A half-bus, transferring data from side A to side B is shown at 204. In one embodiment, all short bus cycles (e.g., accesses that consume 20 nanoseconds of bus time or less) utilize only half-bus mode. Thus, the short cycle shown at time period 201, which transfers data from side B to side A, is completed solely on the local half-bus. During time period 203, both halves of the bus are idle as indicated by the "I". At the beginning of time period 205, side A begins a long access, which as described, may utilize several hundred nanoseconds of bus time. Initially, during the long access, A transfers data only on the local half-bus. However, while data is being transferred on side A, side B's transmit controller 111 arbitrates with any local side B requesters for the side B half-bus (external half-bus to side A) during time period 207. Since there are no local requesters at this time and thus side B is not using its local half-bus at this time, side B grants its use to side A and the long cycle is completed in whole bus mode during time period 209. Thus, the bus is able to exploit idle time by granting use of an idle half-bus to a requesting half bus with a long transfer. Once the half-bus is granted by side B, the whole bus is utilized for the remainder of side A's bus cycle.

In the embodiment illustrated in FIG. 2, all initiated bus cycles over the bus complete without interruption. If, during the transmission of data, the bus enters whole-bus mode, then it stays in that mode until the bus cycle is completed. Both side A and side B keep track of the number of bytes being transmitted and when the bus cycle is complete, both sides resume half-bus mode as shown at 211. In other embodiments, bus cycles may be interrupted, as described, for example, in application Ser. No. 09/099,227, (now U.S. Pat. No. 6,032,211), entitled "Method of Mode Control in a Bus Optimized for Personal Computer Data Traffic", previously mentioned.

During time period 213, side A executes another long cycle. A side B long cycle begins during time period 215. During time period 217, side A's long cycle 213 has been completed and a short cycle from side A to side B is shown. Once that short cycle completes, the LSBs of the data bus (side A) are available to side B. Side A determines if there are any local requesters for its half-bus. That arbitration results in side A granting its half-bus to side B, since there were no local requesters, which causes the bus to switch to whole bus mode. The cycle completes in whole bus mode during time period 221. Once the bus cycle is complete, the bus again enters half-bus mode at 223.

In one embodiment, there are 6 cycle types as shown in Table 1, which also shows hexadecimal decode values. The cycle type "None" specifies that there is no activity on the bus, i.e., the bus is in an idle state as shown, e.g., at 203 in FIG. 3. The write cycle type specifies that the cycle will send address and data from one side to another. The read request cycle type indicates that one side is sending a request to read data from the other side. The read response cycle type indicates that the requested data will be written back across the bus during this cycle. The grant half-bus cycle type specifies that the external half-bus is being granted to a requesting integrated circuit. The grant half-bus cycle is further described in application Ser. No. 09/099,227, (now U.S. Pat. No. 6,032,211), entitled "Method of Mode Control in a Bus Optimized for Personal Computer Data Traffic", previously mentioned. The last cycle type in Table 1, "Whole mode to follow", specifies that the bus will utilize whole mode starting on the next clock edge. This cycle type is sent from the transmit controller which requested and was granted the external half-bus.

TABLE 1

Cycle Types

| Cycle type | Decode | Description |
| --- | --- | --- |
| None | 'h0 | No activity |
| Write | 'h1 | Send address and data from one side to another |
| Read request | 'h2 | Send request to read data from one side to another |
| Read response | 'h3 | Send requested read data back across the link |
| Grant half-bus | 'h4 | Specifies that the external half-bus is being granted to the IC |
| Whole mode to follow | 'h5 | Specifies that the bus will utilize whole mode starting on the next clock edge |

The format for write cycles is shown in Table 2. The first byte sent specifies the type of cycle, which in this case would be a write cycle type. Byte 1 specifies the number of data bytes to be written. The next 8 bytes specify the target address and the subsequent bytes are the write data. The maximum and/or minimum number write data bytes may vary. For example, some implementations may have minimum and/or maximum write data block size requirements.

TABLE 2

Write Cycle Format

| Byte 0: | Specifies the cycle type decode. |
| --- | --- |
| Byte 1: | Specifies the number of data bytes to be written. |
| Bytes [9:2] | Specifies the target address. |
| Subsequent bytes: | Write data. |

The read request format is shown in Table 3. Again, byte 0 specifies the cycle type, byte 1 specifies the number of data bytes being requested and the next eight byes specify the target address.

TABLE 3

Read Request Format

| Byte 0: | Specifies the cycle type decode. |
| --- | --- |
| Byte 1: | Specifies the number of data bytes to being requested. |
| Bytes [9:2] | Specifies the target address. |

The format for a read response is similar to the write response. The first byte sent specifies the type of cycle, which in this case would be a read response cycle type. Byte 1 specifies the number of data bytes to be written. The next 8 bytes specify the target address and the subsequent bytes are the write data. In one embodiment, the read request is sent with an address which is sent back from the receiving side once the data is available. In that way, the side providing read data provides a destination address. Again, the maximum and/or minimum number of data bytes allowed may vary.

TABLE 4

Read Response Format

| Byte 0: | Specifies the cycle type decode. |
| --- | --- |
| Byte 1: | Specifies the number of data bytes to being transmitted. |
| Bytes [9:2] | Specifies the targeted address. |
| Subsequent bytes: | Read data. |

Normally each transmit controller sends 0's across the bus to indicate no activity. That value is changed to a cycle type decode to indicate that a cycle is coming. That is followed by a byte that specifies the number of data bytes of the transfer. If this is a write cycle or a read response that is big enough (read requests always use 10 bytes), then a whole-bus cycle is requested. Whole bus cycle may be requested both explicitly and implicitly. For instance a control message may be sent across the bus that explicitly requests that the receiving side grant its local half-bus to the side sending the message. In another embodiment, the size of the requested transfer implicitly requests whole bus mode. Thus, if the size of the transfer is over a predetermined number of bytes, the transfer will be interpreted as a request for whole bus mode. Various embodiments may use either or both modes of requesting whole bus mode.

When a whole-bus cycle is requested, the external integrated circuit responds by sending the grant half-bus decode to the transmitting integrated circuit when the external half-bus is available. The transmitting integrated circuit then sends the acknowledgment that whole bus mode is starting over the external half-bus. Up until that point, the data had been being sent, both LSBs and MSBs over the local half-bus. However, starting on the clock following whole-bus-mode-to-follow decode, the whole bus is utilized with e.g., the LSBs on the local half-bus and the MSBs on the external half-bus.

The description of the invention set forth herein is illustrative, and is not intended to limit the scope of the invention as set forth in the following claims. For instance, while the embodiment has been described in terms of half-buss, in fact, the portions may be divided up differently. For instance, the bus may be used in an application where more data generally flows in one direction than another. In such cases the bus may be configured to be 24 bits wide with the default mode being 16 bits in one direction and 8 bits in the other. Additionally, the 8 bit side may contend for only an additional eight bits of the bus or may contend for the additional sixteen. Further, the particular cycles types, addressing length and number of bytes of data may vary. The designation of what is a short and long cycle will be determined by system requirements and clock speeds. In addition, other variations and modifications of the embodiments disclosed herein, may be made based on the description set forth herein, without departing from the scope and spirit of the invention as set forth in the following claims.

What is claimed is:

1. A method of communicating on a bus, the bus including a plurality of data lines divided into a first group and a second group, the data lines coupling a first and second bus interface circuit, the method comprising:

transferring first data over the first group data lines from the first to the second bus interface circuit in half bus mode during a first time period on the bus;

transferring second data from the second to the first bus interface circuit over the second group of data lines in half bus mode during the first time period; and transferring third data from the first to the second bus interface circuit over the first and second group of data lines in whole bus mode during a second time period, the second time period being different from the first time period, and wherein the first bus interface circuit requests use of the second group of data lines to transfer data from the first to the second bus interface circuit and the second bus interface circuit grants use of the second group of data lines prior to the first bus interface circuit transferring data on said second group of data lines, and wherein said first bus interface circuit implicitly requests use of the second group of data lines to transfer data in whole bus mode, according to an amount of data to transfer, the second bus interface circuit granting the implicit request according to data transfer requirements of the second bus interface circuit.

2. The method as recited in claim 1 wherein the first and second bus interface circuits are disposed respectively in first and second integrated circuit chips.

3. The method as recited in claim 2 wherein the bus is a point to point bus connecting the first and second integrated circuit chips.

4. The method as recited in claim 1 further comprising transferring fourth data from the second to the first bus interface circuit in whole-bus mode over the first and second group of data lines during a third time period, the third time period being different from the first and second time periods.

5. The method as recited in claim 4 wherein the first and second bus interface circuits are disposed respectively in first and second integrated circuit chips.

6. The method as recited in claim 4 wherein the bus is a point to point bus connecting the first and second integrated circuit chips.

7. The method as recited in claim 1 wherein for a bus cycle transferring a plurality of address and data information, for a first part of the bus cycle, said information is transmitted in half bus mode over said first group of data lines and not said second group of data lines, and wherein for a second part of the bus cycle said information is transmitted in whole bus mode over both said first and second group of data lines.

8. The method as recited in claim 4 wherein said second bus interface circuit requests use of the first group of data lines to transfer data in whole bus mode explicitly via a control message on the bus.

9. The method as recited in claim 1 further comprising:
providing a first clock signal from a first transmit controller in the first bus interface circuit to a first receive controller in the second bus interface, circuit; and wherein
the first data is transmitted in synchronism with said first clock.

10. The method as recited in claim 9 further comprising:
providing a second clock signal from a second transmit controller in the second bus interface circuit to a second receive controller in the first bus interface circuit; and wherein the second data is transmitted in synchronism with said second clock.

11. The method as recited in claim 10 wherein the third data is transmitted on the bus in synchronism with the first clock.

12. The method as recited in claim 11 further comprising:
transferring fourth data from the second to the first bus interface circuit over the first and second group of data lines during a third time period, the third time period being different from the first and second time periods; and wherein the fourth data is transmitted in synchronism with said second clock.

13. The method as recited in claim 1 wherein first, second and third data are transferred in bus cycles, each bus cycle being a block transfer of address information or address information and data from one of said first and second bus interface circuits to the other of said first and second bus interface circuits.

14. The method as recited in claim 13 wherein bus cycles include long bus cycles lasting more than a predetermined amount of time and short bus cycles lasting less than the predetermined amount of time.

15. The method as recited in claim 14 wherein the predetermined amount of time is approximately 20 nanoseconds.

16. The method as recited in claim 14 wherein all short cycles from the first to the second integrated circuit are completed over the first group of data lines and wherein all short cycles from the second the first integrated circuit are completed over the second group of data lines.

17. The method as recited in claim 14 further comprising sending a long cycle over the bus.

18. The method as recited in claim 17 wherein sending long cycles further comprises sending data over said first and second group of data lines during at least a portion of said long cycle.

19. The method as recited in claim 13 wherein each bus cycle includes at least one group of data providing cycle type information, and wherein cycle type information includes at least one of, a write cycle type indicating a cycle wherein address and data is sent from one of the first and second bus interface circuits to the other of the first and second bus interface circuits, a read request cycle type indicating a request to read data from one of the first and second bus interface circuits, a read response cycle type, indicating data being sent back in response to said read request, and a grant half-bus cycle indicating that an external half bus is being granted to a requesting bus interface circuit, or a whole bus mode to follow cycle type indicating that the bus will utilize whole bus mode on a next clock edge.

20. A bus interface circuit for interfacing to a bus, comprising:

a first transmit controller coupled to transmit first data to a first group of data lines of the bus during a first time period;

a first receive controller for receiving second data from a second group of data lines of the bus during the first time period; and wherein said bus interface circuit, responsive to a granted request, transmits third data to said first and second group of data lines during a second time period, the second time period being different from the first time period, wherein said bus interface circuit implicitly requests use of the second group of data lines for a whole bus mode transfer according to an amount of data to transfer.

21. The bus interface circuit as recited in claim 20 wherein the bus interface circuit receives fourth data over the first and second group of data lines during a third time period, said third time period being different from said first and second time periods.

22. The bus interface circuit as recited in claim 21 wherein the bus interface circuit further comprises an arbiter circuit coupled to said bus and responsive to an arbitration cycle to determine whether to place the bus in whole bus mode, whole bus mode being when said bus interface circuit is simultaneously doing one of transmitting data over said first and second group of data lines and receiving data over said first and second group of data lines.

23. The bus interface circuit as recited in claim 22 wherein half bus mode is default operating mode on said bus, half bus mode being when said first bus interface circuit is coupled to send data over the first group of data lines and coupled to receive data over said second group of data lines.

24. The bus interface circuit as recited in claim 21 further wherein the first transmit controller is further coupled to provide a first clock signal to a first clock signal line of said bus, the first data first data being transmitted in synchronism with said first clock signal.

25. The bus interface circuit as recited in claim 24 wherein the first receive controller is coupled to receive a second clock signal, the second data being received in synchronism with said second clock.

26. The bus interface circuit as recited in claim 25 wherein said third data is transmitted on the bus in synchronism with said first clock.

27. The bus interface circuit as recited in claim 26 wherein said fourth data is received in synchronism with said second clock.

28. The bus interface circuit as recited in claim 20 wherein said bus interface circuit is coupled to transfer and receive bus cycles on said bus, each of the bus cycles being a block transfer including address information or including address information and data.

29. The bus interface circuit as recited in claim 28 wherein the bus cycles include long bus cycles lasting more than a predetermined amount of time and short bus cycles lasting less than the predetermined amount of time.

30. The bus interface circuit as recited in claim 29 wherein the predetermined amount of time is approximately 20 nanoseconds.

31. The bus interface circuit as recited in claim 29 wherein all said short cycles transmitting data over said first group of data lines are completed over said first group of data lines and wherein all short cycles receiving data from over said second group of data lines are completed over said second group of data lines.

32. The bus interface circuit as recited in claim 29 wherein during at least a portion of said long cycle, said first integrated circuit is coupled to transmit data over said first and second groups of data lines.

33. The bus interface circuit as recited in claim 29 wherein during at least a portion of said long cycle, said first integrated circuit is coupled to receive data over said first and second groups of data lines.

34. The bus interface circuit as recited in claim 20 wherein the bus interface circuit is disposed on an integrated circuit and wherein said integrated circuit includes a processor core.

35. The bus interface circuit as recited in claim 20 wherein the request for use of the second group of data lines for a whole bus mode transfer is implicitly made when the amount of data to transfer is greater than a predetermined number of bytes.

* * * * *